US010576902B2

(12) United States Patent
Williams

(10) Patent No.: US 10,576,902 B2
(45) Date of Patent: Mar. 3, 2020

(54) CARGO CARRIER SYSTEM

(71) Applicant: Marty Williams, Colorado Springs, CO (US)

(72) Inventor: Marty Williams, Colorado Springs, CO (US)

( * ) Notice: Subject to any disclaimer, the term of this patent is extended or adjusted under 35 U.S.C. 154(b) by 335 days.

(21) Appl. No.: 15/410,443

(22) Filed: Jan. 19, 2017

(65) Prior Publication Data

US 2017/0203699 A1 Jul. 20, 2017

Related U.S. Application Data

(60) Provisional application No. 62/280,635, filed on Jan. 19, 2016.

(51) Int. Cl.
*B60R 9/10* (2006.01)
*B60R 9/06* (2006.01)

(52) U.S. Cl.
CPC . *B60R 9/06* (2013.01); *B60R 9/10* (2013.01)

(58) Field of Classification Search
CPC .............. B60R 9/06; B60R 9/10; B62D 63/08
See application file for complete search history.

(56) References Cited

U.S. PATENT DOCUMENTS 5,236,110 A * 8/1993 Schmidt .................... B60R 9/06 224/42.33
5,595,333 A * 1/1997 Boston ...................... B60R 7/14 211/60.1
6,089,428 A * 7/2000 Wagner ..................... B60R 9/10 224/401
6,886,968 B1 * 5/2005 Hamelink ................ B60D 1/58 280/163
9,745,006 B2 * 8/2017 Pemberton ................ B60R 9/06
2002/0195473 A1 * 12/2002 Fournier ................... B60R 9/06 224/502
2004/0262351 A1 * 12/2004 Hunt ......................... B60R 9/06 224/518
2005/0247747 A1 * 11/2005 Henry ....................... B60R 9/06 224/401
2006/0175369 A1 * 8/2006 Vermette .................. B60R 9/06 224/501
2013/0092714 A1 * 4/2013 Niemi ....................... B60P 3/10 224/401

* cited by examiner

*Primary Examiner* — Corey N Skurdal
(74) *Attorney, Agent, or Firm* — R. Lynette Wylie; Apex Juris, pllc.

(57) ABSTRACT

The current invention teaches a cargo management apparatus for use on a vehicle tongue where the apparatus has a bottom plate, a first riser member with a bottom end, a middle portion and a top end, and a second riser member with a bottom end, a middle portion and a top end, where the bottom end of the first riser member and the bottom end of the second riser member are secured to a top side of the bottom plate; a top member, where the top end of the first riser member and the top end of the second riser member are secured to a bottom side of the top plate, this base then further having an accessory mount securedly affixed on top of the base with the ability to secure a variety of cargo carrying accessories.

18 Claims, 16 Drawing Sheets

CARGO CARRIER SYSTEM

RELATED APPLICATIONS

The present invention claims priority to provisional patent application 62/280,635 for a Cargo Carrier Mounting System filed with the USPTO on 2016 Jan. 19, the contents of which is incorporated herein in its entirety.

BACKGROUND OF THE INVENTION

There exist numerous hitch mounts for trailer accessories to carry supplies and equipment, such as, bicycles and other cargo carriers for transportation of such items on, or on the rear of, a vehicle, trailer or chassis. As used herein, a vehicle is a thing used for transporting people or goods and can be a car, a truck, a trailer, a trailer frame or chassis. Conventional carriers have mounts that are generally dedicated to a particular item, such as, for example, a bicycle or cargo carrier. Hitch-mounted carriers are popular for use on SUVs and other vehicles that have hitch or tow attachments. A bracket or hitch mounted tube on which such conventional carrier systems are permanently or semi-permanently mounted typically include securing mechanisms corresponding to a particular piece of equipment, case, or article, and lack adaptability to other types of surfaces or cargo.

That is, dedicated carriers have distinct mounting mechanisms and carrier frames adapted for fastening and transporting particular equipment, gear or other cargo type. For example, bicycles, jet or snow skis, snowboards, as well as, surfboards and wakeboards require dedicated mounting mechanisms having distinct receiver tubes and brackets.

In addition, conventional carrier systems typically are limited to mounting systems for a single hitch receiver, and use thereof are preempted when a trailer or other accessory is mounted on the hitch. Moreover, such prior art systems typically are rigidly aligned to accommodate specific equipment or cargo configurations and therefore are limited to a dedicated, single use.

With regard to bicycle carriers, even different cycle species, such as unicycles, road bicycles, mountain bicycles with different frame configurations or children's bicycles, each may require distinct carriers. For example, conventional hitch mounted carriers typically have welded crossbars with horizontally extending arms positioned to accommodate the frames and handle bars of standard bicycle sizes. Such bicycle carrier frames typically are not adaptable to different bicycle frame designs, alternative bicycle styles, such as full suspension mountain bikes, or even children's bicycles. Also, they are not able to be reconfigured or altered in any way to carry alternative cargo or equipment. In addition, conventional carriers are often heavy and awkward to align and mount onto the vehicle.

For example, hitch mounted carriers typically have a square bar or tube that is fitted to slide into a receiver mounted on the vehicle. A pin engages the bar or tube in the receiver to secure the carrier to the vehicle and a mounting bar is permanently mounted onto the tube with horizontally extending arms onto which a bicycle is secured. These prior art carriers are heavy, and awkward to align and mount onto the vehicle.

Also, the receivers and mounting mechanisms of conventional cargo carriers typically are not adaptable to alternative carrier configurations and applications. Different mounting mechanisms and hardware are required for different carriers and to fasten varying cargo types. A further disadvantage of such dedicated systems is their incapacity to accommodate bulky configurations in the limited space behind a vehicle when a trailer is hitched to a vehicle.

Another problem with hitch mounted carriers is that they have to use the vehicle hitch receiver making it unavailable for any other use or application. Since conventional hitch mounted carriers are mounted to the hitch receiver the vehicle hitch may not be used for another use. In other words, once the receiver is used for the first application, say for example, pulling a trailer, then it is unusable for other uses. Often it is necessary to use the hitch receiver for other purposes, such as towing a trailer. In that event, such a conventional hitch-mounted carrier cannot be mounted. U.S. patent application Ser. No. 11/697,294 addresses such and other problems relating to hitch-mounted carriers by providing a system with adjustment mechanisms for mounting a bicycle carrier on a shank above a hitch receiver whereby a trailer or other accessory may be connected to the hitch receiver. It further enables cargo to be mounted above and clear of the heat emanating from the exhaust tailpipe of a vehicle to which a cargo carrier is attached.

However, in view of the increasing demand for a burgeoning array of recreational equipment, as well as, other equipment, as well as, tools, supplies and other cargo consumers wish to transport to their travel destination, a need nonetheless persists for yet an additional mounting mechanisms and systems for expanded cargo demands. There is a need for an adaptive mounting, fastening and cargo carrier system to utilize the available space behind and above a vehicle when a trailer is hitched to a vehicle. Specifically, with respect to the present invention claim set there is a need for a cargo carrier system that is useable on a vehicle chassis such as a trailer chassis and more specifically on a trailer chassis tongue, and further with a trailer jack and that can provide additional storage space above the trailer jack and in front of the trailer.

Many drawbacks in the current art of cargo management result from such lack of adaptability, versatility and portability, including limited or singular application cargo mounting mechanisms including receivers, brackets and fasteners. As detailed herein, differing mounting mechanisms, such as receivers and brackets of equipment and carrier cases have in the past required separate and distinct carrier systems. Moreover, these mounting devices are limited to specifically corresponding surfaces, hitch or other receiver tubes, and they typically lack a bumper mount option. Such conventional carrier mounts lack adaptability and portability. Due to such and other drawbacks, conventional carriers require multiple and distinct mounts and brackets and have limited or single application uses where they are suited to single surfaces, rails or bars, depending on the size and shape of the equipment or other cargo.

In sum, there exists nothing in the prior art that provides a versatile, adaptable, readily adjustable cargo carrier adaptable for mounting on vehicles while a trailer hitch is in use for another mechanism and adaptable for mounting equipment or other cargo in a manner optimizing the use of space above or about a trailer hitched to a vehicle. There is also a lack of mounting mechanisms adaptable to various types, sizes and shapes of cargo, such as, for example, recreational or cargo between locations. There is also nothing in the prior art that provides a versatile, adaptable, readily adjustable carrier adaptable for mounting on a vehicle, such as a trailer chassis or any other chassis that utilizes a jack, that optimizes the space above, around or about the trailer jack. Typically, the space above and around the jack is empty and is not utilized or used. This is typically true because the jack itself utilizes this space alone. Because the space is occupied by the jack there has previously been no way to utilize the space above and behind the jack. Thus, there persists a need for a cargo carrier mounting system that overcomes such and other limitations, problems and drawbacks.

SUMMARY OF THE INVENTION

The present invention solves these and other problems by providing a versatile, adaptive, and portable cargo carrier system for use with vehicles and or with a trailer tongue of a vehicle, such as a trailer. In one embodiment of the present invention an attachment apparatus is used that encompasses a drop leg jack so that a cargo carrying apparatus can be used and where the cargo carrying apparatus is located above the jack. The cargo carrying apparatus then can have a variety of attachment apparatus that allow for other apparatus, such has bicycle carriers, snow board carriers, and the like. In one embodiment there is a Y receiver having a shank and two outwardly angled mounting members with receiving ports to form a flared "U" such that the combined shank and mounting members resemble a "Y" shape. The receiving ports are configured for mated insertion of at least one and preferably two corresponding arm members providing a frame for adaptive attachment of variously sized and shaped cargo or equipment. In one embodiment of the present invention the arm members received in the flared U shaped receiver preferably comprise square tubes oriented to angle outwardly and are adjustable to an extent equipment or cargo is well supported.

As further described in the detailed description of alternative embodiments below, one embodiment features a nested tube shank sized to correspond to two standard trailer hitch receiver sizes, wherein the outer tube corresponds to trailer hitch receivers conventionally installed on recreational vehicles and the inner tube corresponds to other vehicle trailer hitches.

As illustrated in the drawings and described in detail herein, various embodiments of the present invention deploy mounting members angled outwardly from a shank slidably securable in a trailer hitch receiver or integrally connected to a bumper mount employing flanges of a hat bracket securable in braced engagement to the bumper. Such versatile adaptability and portability of the mounting members according to the present invention thus imparts significant features and advantages thereof. Alternative embodiments of the present invention employing a bumper mount provide a Y receiver integrally affixed to an upper planar surface of a plate with perpendicularly oriented flanges spaced apart a distance corresponding to a vehicle bumper providing a bracketed housing. In particular embodiments, a second opposing planar member with hat bracket flanges corresponding to the bumper is braced in parallel aligned correspondence along the lower surface of the bumper and bolted into tightened engagement with the upper planar member to thereby securely position the Y receiver above the bumper. The bumper mount may alternatively be secured with a pin or clamp fitted for braced, seated engagement with a standard bumper and can be configured to fit alternative bumper sizes.

The present invention further includes rectangular frame bases providing internal pockets adapted for carrying suitable cargo or equipment while simultaneously orienting the Y receiver to access spaces with adequate area and which further aerodynamic efficiency. Such pockets may be vertically aligned and particularly adapted to standard equipment, such as, for example, a trailer jack, above which arms received in the Y receiver are elevated to access the area above a propane gas tank. Alternatively, a horizontally aligned rectangular pocket may be adapted to a corresponding cargo carrier whereon vertically aligned Y receivers and mounting mechanisms provide for fastening suitably configured items to arms inserted and secured thereto. The following drawings and detailed description of preferred embodiments clarify details and applications of the present invention. Hence, these and other features of the present invention will be evident from the ensuing description of preferred embodiments along with the drawings.

DETAILED DESCRIPTION OF EMBODIMENTS

Referring to the Figures, embodiments of the present invention include aspects and features for adaptably mounting and fastening about a hitch receiver to transport variously configured cargo and equipment, as further described herein. An aspect of the adaptable cargo carrying system defined above and shown in FIGS. 1-2 includes a portable Y receiver 10 having two outwardly extending angled mounting members for receiving arm members, wherein the shank and angled mounting members generally configure and form the shape of a Y.

Figure 1:
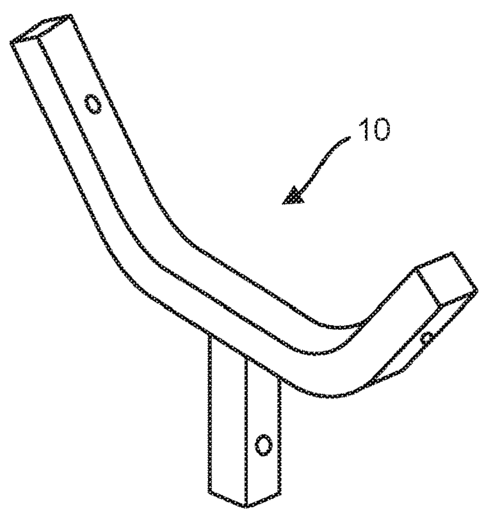
FIG. 1 is a view of a Y receiver of a preferred embodiment of the present invention.
Figure 2:
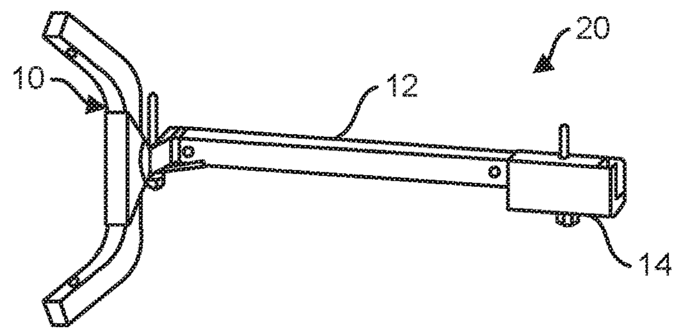
FIG. 2 is a perspective view of one embodiment of the Y receiver attached to a shank for attachment to a trailer hitch receiver.

Referring to FIG. 1, the shank of the Y receiver of this embodiment comprises a vertical trunk extending into an axial base from which two outwardly angled mounting members protrude to form the "Y" configuration. The Y receiver may be composed of any rigid metal or polymeric material in dimensions and density providing sufficient tensile strength to support relevant cargo. As shown in FIG. 2, a hitch receiver shank 20 is configured for slidable insertion of shank tube 12 into a hitch receiver 14 secured by a locked pin threaded through corresponding holes of the hitch receiver and shank of the Y receiver securing therein.

As used herein, "arm member" refers to any rigid, elongated bar, rod, or tube of configured for mated insertion into a port of the Y receiver according to the present invention and of sufficient tensile strength to support relevant cargo. Arm members slidably engaged and secured into the outwardly angled mounting ports provide a frame for attachment of equipment and cargo by commercially available means. In particular embodiments, arm members are provided with protrusions such as hooks, hangers or other appendages that can be inserted through holes in the arm members for mounting or anchoring fasteners. As used herein, "vehicle" refers to cars, trucks, recreational vehicles or trailers.

Figure 3:
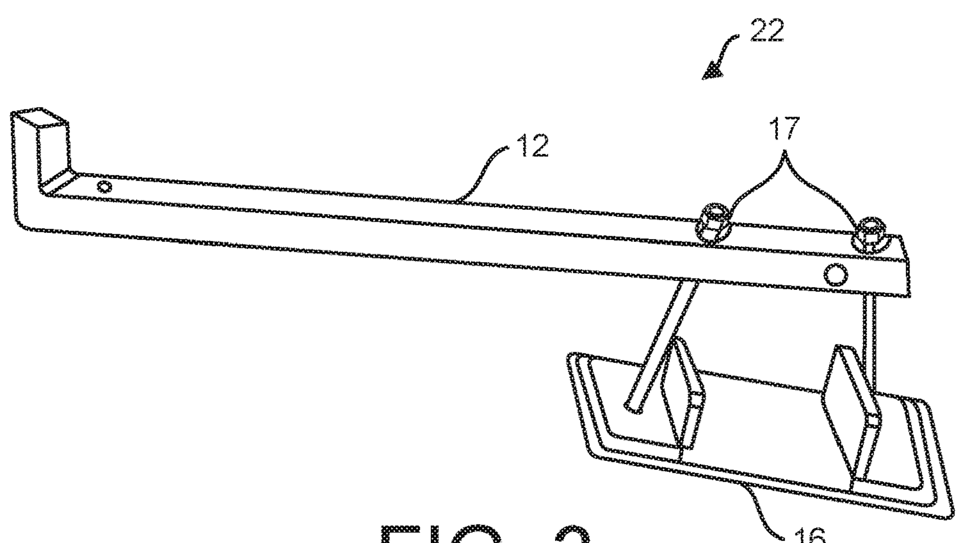
FIG. 3 is a perspective view of an embodiment of the present invention showing the Y receiver attached to shank having bumper mount brackets and fasteners.

The present invention provides a modular configuration alternatively attachable to a hitch receiver or bumper. Embodiments attachable to hitch receivers employ a shank sized and configured for slidable engagement with a hitch receiver. Now referring to FIGS. 1-3, the present invention thus provides a modular configuration alternatively attachable to a hitch receiver shank 20 shown in FIG. 2 or a bumper mount assembly 22 whereby hitch assembly is required, as shown in FIG. 3. Embodiments attachable to hitch mounts employ a shank sized and configured for slidable engagement with a hitch receiver.

In particularly preferred embodiments, hitch receiver 14 comprises two nested square tubes. The inner tube is a 1 in.×1 in. (2.54 cm×2.54 cm) square and the outer sleeve comprises a 2.5 in.×2.5 in. (6.35 cm×6.35 cm) tube. The square tube sizes of the latter described preferred embodiment correspond to conventional trailer hitch receivers installed in vehicles. The outer tube fits standard hitch receivers on recreational vehicle and the inner tube fits standard hitch receivers in other vehicles.

Referring to FIG. 3, the present invention further comprises fastening the Y receiver on a plate 16 with perpendicularly oriented flanges spaced apart a distance corresponding to a vehicle bumper providing a bracketed housing for a Y receiver hereinafter referred to as a "bumper mount." The bumper mount 22 may be secured with pins 17 or clamp fitted for braced, seated engagement with a standard bumper measuring 4"×4"/(10 cm×10 cm). Although preferred embodiments are configured to fit the latter standard bumper size, the bumper mount may be adjusted to fit alternative bumper sizes. The bumper mount 22 provides the advantage of providing a cargo carrier mount when the hitch receiver is engaged, e.g., towing a trail.

Figure 4:
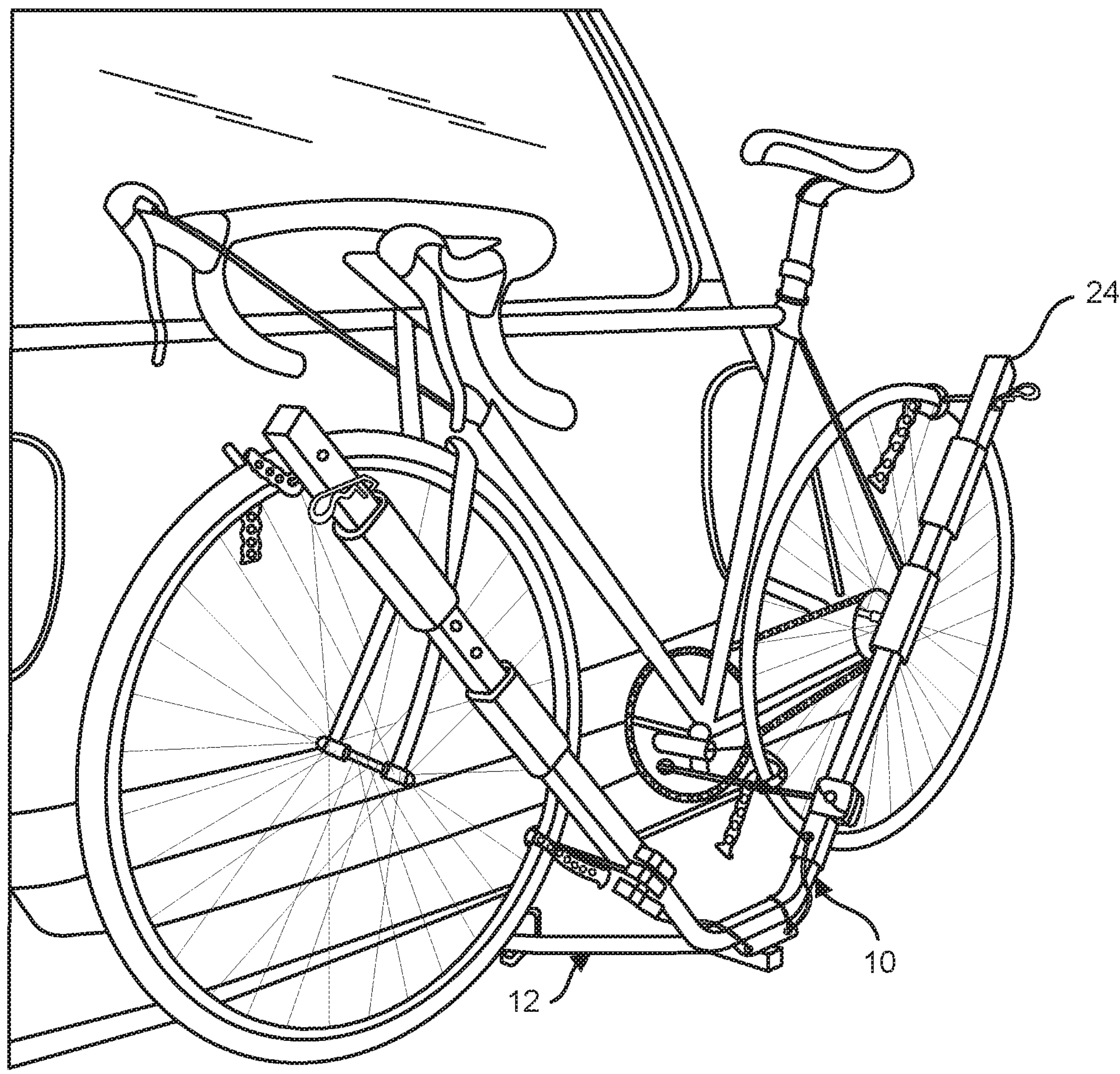
FIG. 4 is a perspective view showing an embodiment wherein the Y mount is used in conjunction with a v-shaped bicycle rack that also can be used to hold a cargo bag system and where the entire system is affixed to a vehicle receiver.
Figure 4A:
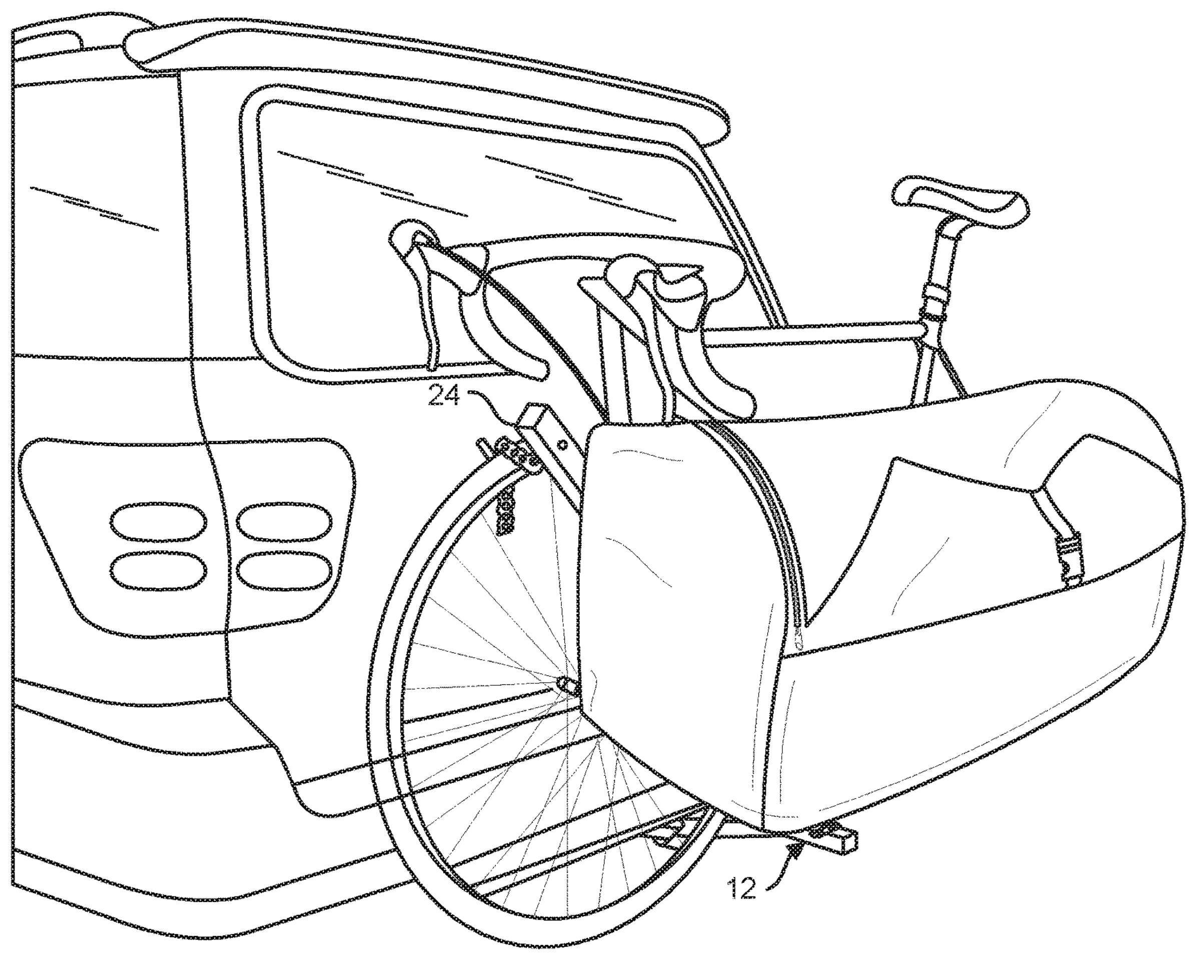
FIG. 4A is a perspective view showing an embodiment wherein the Y mount is used in conjunction with a v-shaped bicycle rack and the entire system is affixed to a vehicle receiver.
Figure 4B:
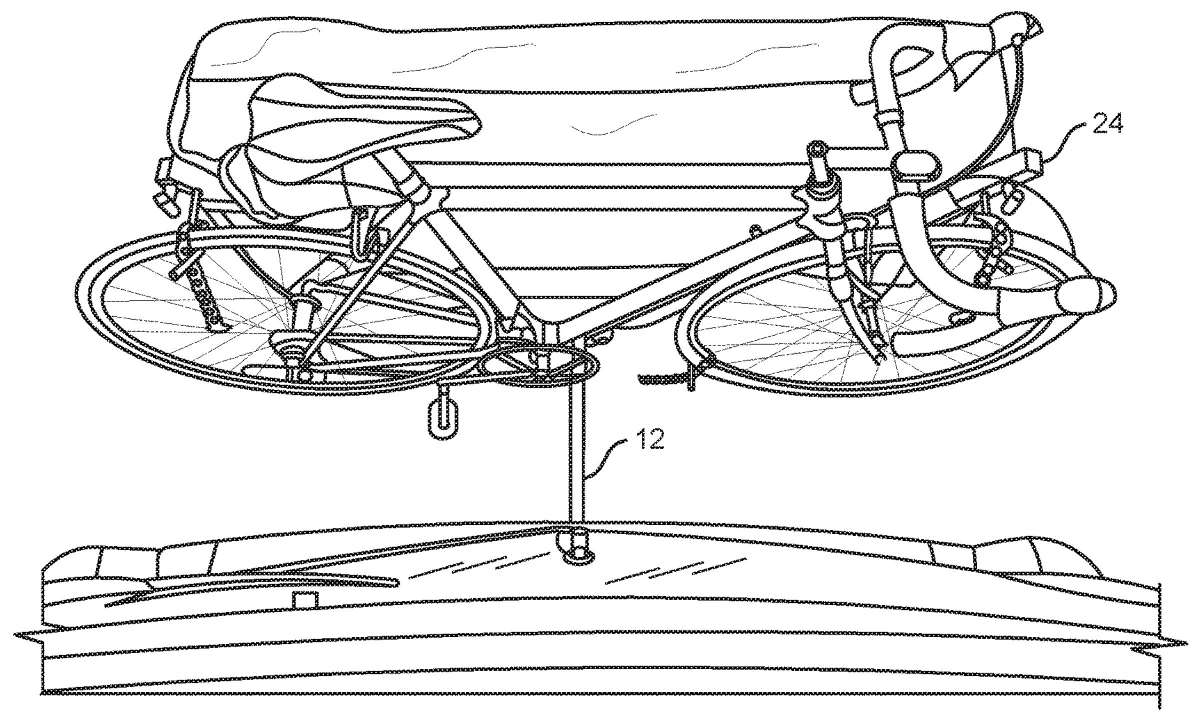
FIG. 4B is an overhead view showing an embodiment wherein the Y mount is used in conjunction with a v-shaped bicycle rack and the entire system is affixed to a vehicle receiver.

To provide an adaptive frame for fastening cargo including various types of carriers and equipment as shown in FIGS. 4, 4A and 4B, arm members 24 are inserted into the outwardly angled tubes of the Y receiver 10. In the illustrated embodiments, it is contemplated that the height of the arm members 24 relative to the mounting mechanism can be adjusted so that cargo can be fastened through commercially available means above the rear of a vehicle. This is particularly useful for accessing the area above the rear of a vehicle towing a trailer, where there is more space for carrying bulky or multiple items above the more limited space directly between a hitched vehicle and trailer where a propane tank and other trailer accessories are typically stowed. These adjustable arm members 24 impart adaptive positioning of diversely sized and shaped cargo in adequately sized and aerodynamically efficient spaces rearward of a vehicle.

Equipment and cargo may be attached to the arm members inserted into the Y receiver 10 of the present invention by commercially available fasteners and supports including, without limitation, cradles and collars for wheels or other suitably shaped structures, hooks, bungees, clamps, clips, clasps, carabiners. Adjustment of fasteners and supports along the angular orientation of the arm members facilitates accommodation to differing types, sizes and shapes of cargo.

In alternative embodiments, the length of the angled arm members is adjustable, thereby enabling changing the height of the arm members 24 relative to the mounting mechanism. This is particularly useful for accessing the area above the rear of a vehicle towing a trailer, where there is more space for carrying bulky or multiple items above the more limited space directly between a hitched vehicle and trailer, particularly in the area above the trailer platform, where propane tanks and other trailer accessories are often stowed. Another feature of such versatile stowage orientation enables adjustment of the height of the arm members 24 and adapting fasteners to enable the cargo on rear of vehicle applications to be mounted well away from the heat of the vehicle tailpipe emission.

These adjustable arm members 24 thus impart versatile adaptability of the present cargo carrier and combinations thereof as well as to applications hauling variously sized and shaped cargo, which may include, without limitation, recreational and other equipment, tools and supplies.

In particular, arm members 24 may be adjusted to extension points commensurate to the respective cargo. This allows adjustment of the carrier for differing heights, as well as, lengths since the arm members are adjusting at an angle.

Y receivers 10 in such embodiments are secured in corresponding vertically aligned receiver tubes integrally affixed to the carrier by bolts or welding, preferably to a side wall of the cargo carrier. FIG. 4 is shown with the receiver installed with a vehicle and the extended bars that form a V-shaped carrier where a bicycle can be attached by the wheels to the carrier thereby allowing for a wide range and variety of bicycle shapes, frame designs and sizes.

FIG. 4A shows the same configuration as taught in FIG. 4 with the addition of a bag component that can be secured to the same V-shaped rack. The V-shaped rack is entirely adjustable so that it can be used to carry a wide variety of recreational or other accessories, including but not limited to bicycles, cargo bags, ski boards, water skis, snow skis, weed wackers or weed trimmers, yard equipment, ladders, and almost anything else imaginable.

FIG. 4B is overhead view of FIG. 4A showing the bicycle and bag secured to the V-shaped rack.

FIGS. 5-13 illustrate an embodiment of the present invention wherein one or more Y receivers 10 may be attached to a horizontally aligned tower base unit 30 attachable to corresponding mounts on trailer tongues, in cargo carriers or containers having lower planar horizontal surfaces, such as, for example, wheeled equipment carriers, box carriers, and pick-up truck beds. In one application, a tower base unit 30 provides a jack mount assembly, as shown in use in FIG. 12, wherein a jack 56 is mounted on a jack mounting plate 36. In this embodiment of the present invention the Y receiver 10 can be slidably inserted in accessory mount 42 on a top member 38 of a vertically oriented rectangular frame comprised of opposing riser members 32 connected at perpendicular corners to bottom plate assembly 40 and top member 38. Spaced apart to form triangular oriented fastener holes 35 forming a jack mounting plate 36 configuration to provide a rectangular pocket that is large enough to accommodate a drop leg jack. When used with a jack this assembled unit provides the base unit assembly base unit shown in FIG. 12, which is shown on display frame 54 to shown the drop leg jack 56 in a use position.

Figure 12:
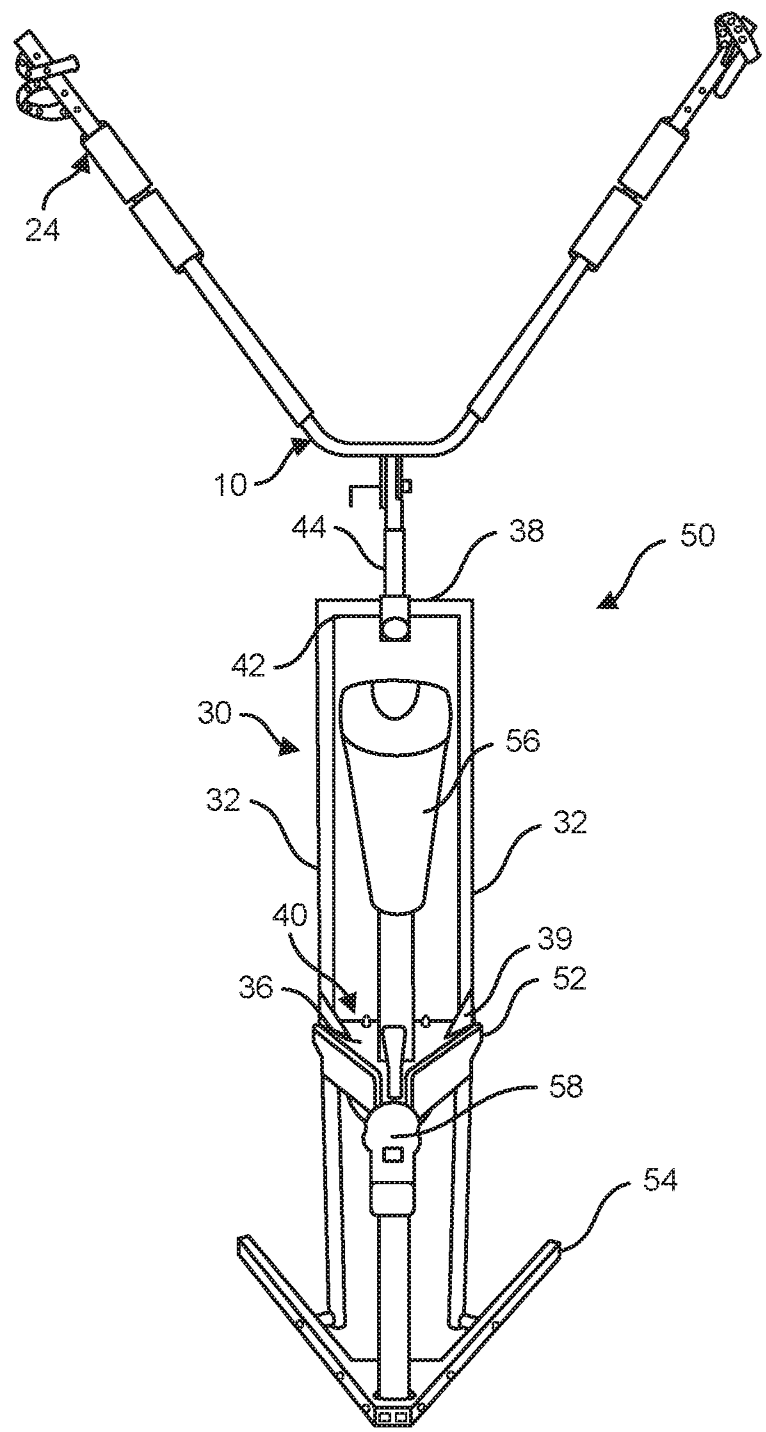
FIG. 12 is a frontal view of the base unit assembly base unit as used with a drop leg jack and have the accessory adapter and V-shaped bicycle rack attached to the accessory adapter.
Figure 13:
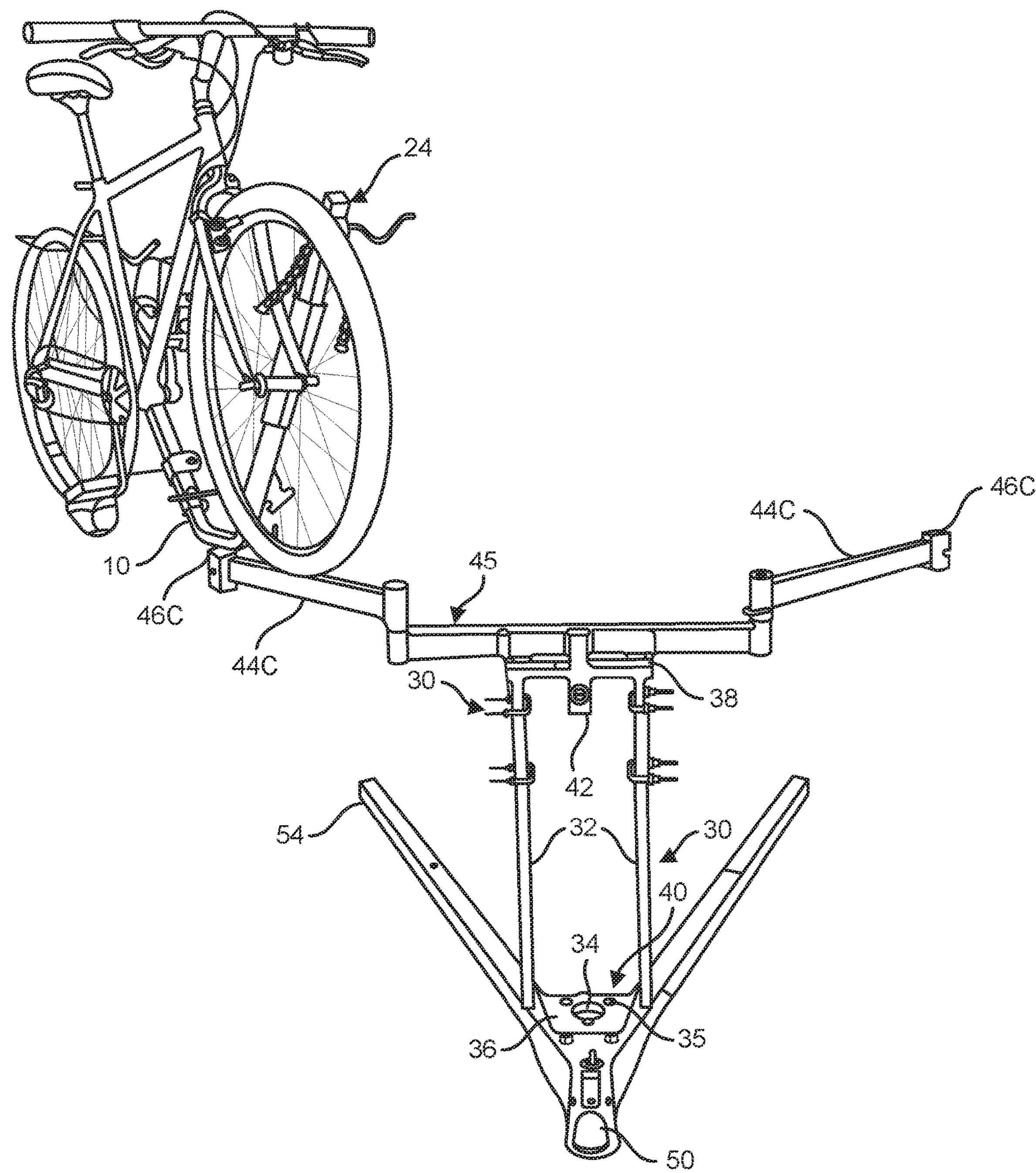
FIG. 13 is a frontal view of the base unit assembly base unit being used with a four bicycle carrier rack affixed to the top of the base unit assembly base unit.

In the embodiment of the present invention as shown in FIGS. 12 and 13, base unit assembly 30 includes jack mounting plate 36 having a plurality of holes juxtapositioned for mounting a jack typically found on an RV chassis or other trailer type chassis. Holes 35 of jack mounting plate 36 will usually share a common bolt pattern used with a typical A-Frame coupler and jack. The tower base unit 30 has a bottom portion, a middle receiver portion, and an upper portion. Riser members 32 attach to the bottom plate assembly 40 directly and are preferably reinforced by corner gusset 39. The corner reinforcements gussets 39 are placed to transfer load and deflection forces from the riser members 32 to the bottom jack mounting plate 26 and to riser members 32 and top member 38 forming the frame of base unit assembly 30. The corner reinforcement gussets 39 are preferably positioned so as to not interfere with the jack mounting plate 26 and three hole bolt pattern 35. The upper part of the base unit assembly 30 has an accessory mount 42 for attaching a variety of cargo carriers. The accessory mount 42 is preferably vertically aligned above hole 34 and preferably is provided with an opening in base unit assembly 30 such that in the event of an electric failure the jack screw manual override port can be accessed so the jack can be manually controlled without having to remove the base unit assembly 30.

Figure 5:
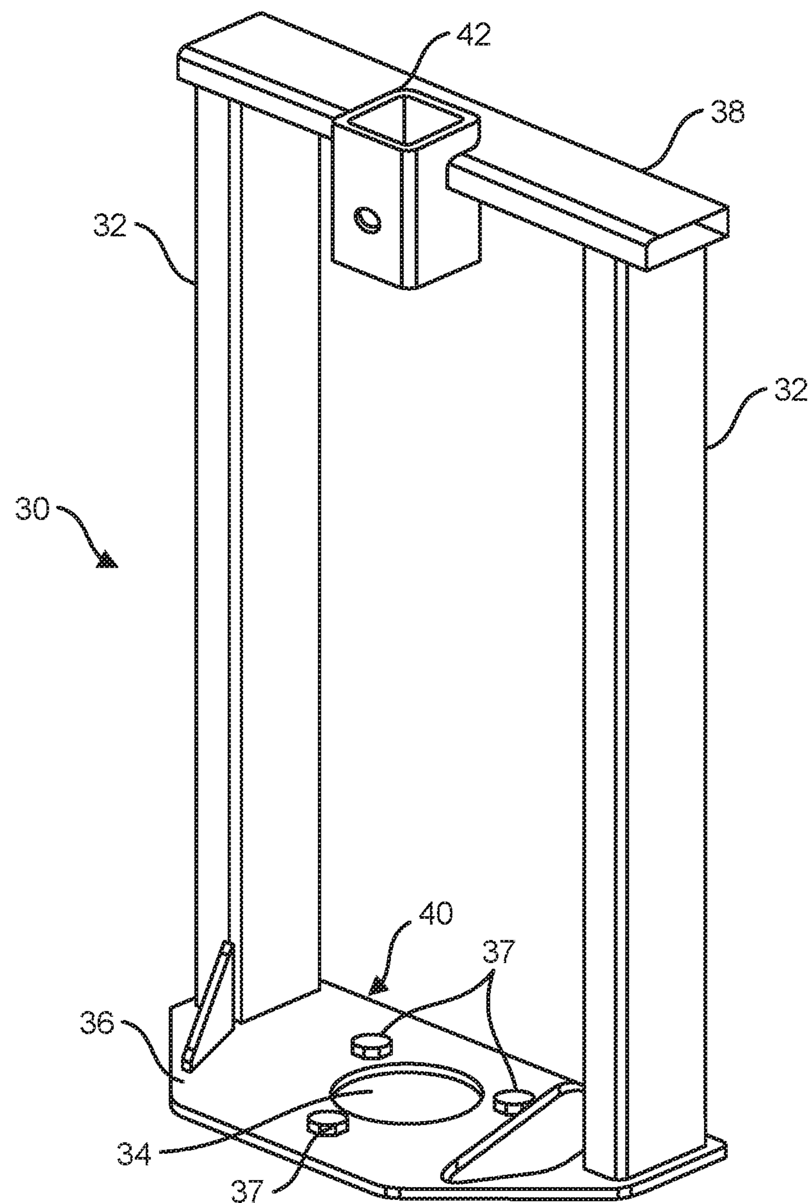
FIG. 5 is a perspective view of the perspective view of an embodiment of the present invention showing a base unit assembly base unit.

To more clearly define the identified parts, reference is now made to FIGS. 5 through 9. FIG. 5 shows only the base unit assembly 30. When this unit is used in conjunction with a jack it could be referred to as the base unit assembly base unit. In this embodiment the base unit assembly 30 has a bottom plate 36 and it is shown with common patterns of fastener holes 35 that typically fit most A-Frame jacks. FIG. 6A illustrates accessory exchange adapter 44 extending the reach of Y receivers 12 and arms 24 to utilize empty space above the trailer tongue or draw bar to provide added storage.

Figure 6:
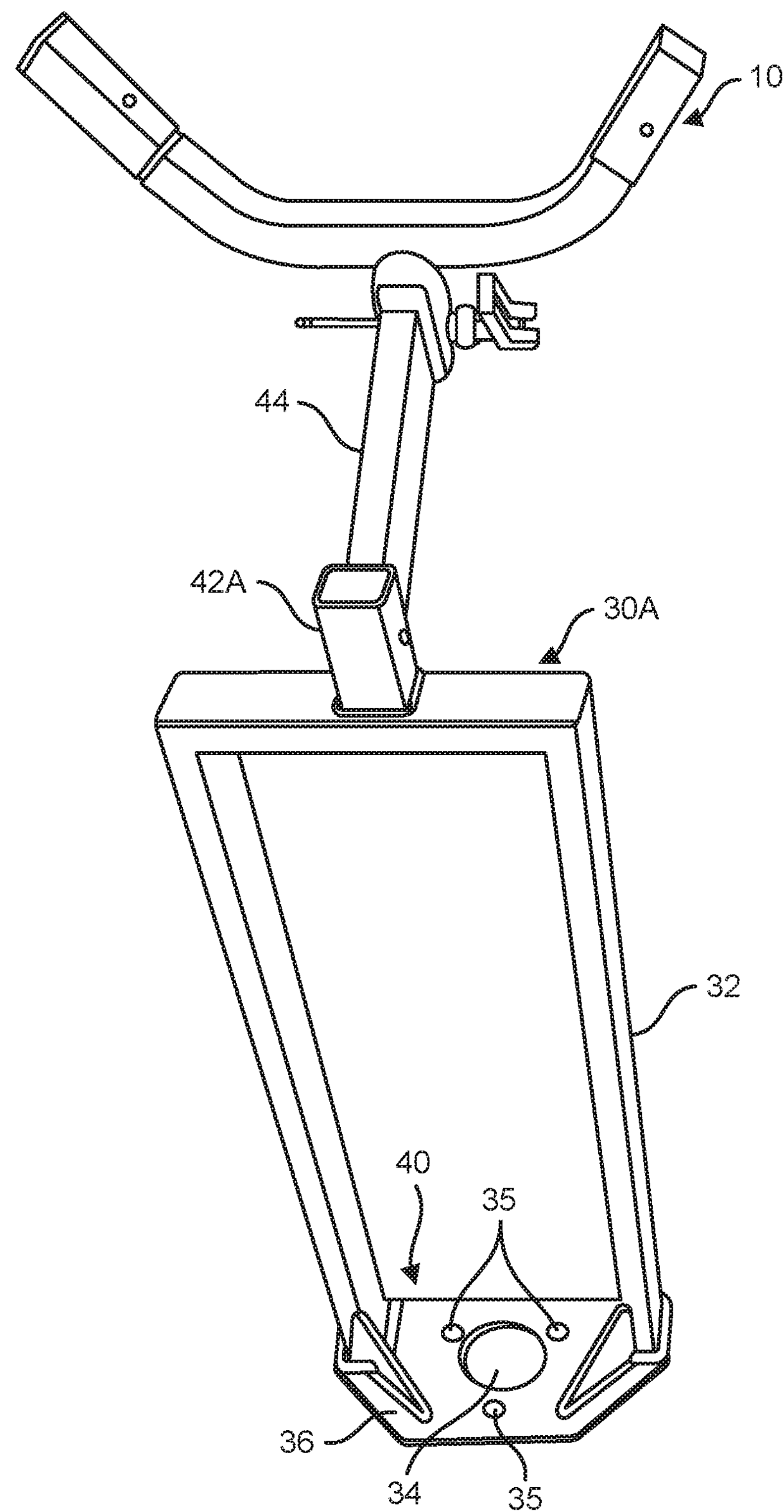
FIG. 6 is a perspective view of the perspective view of an embodiment of the present invention showing a base unit assembly, an accessory exchange adapter and Y-shaped arm member.
Figure 6A:
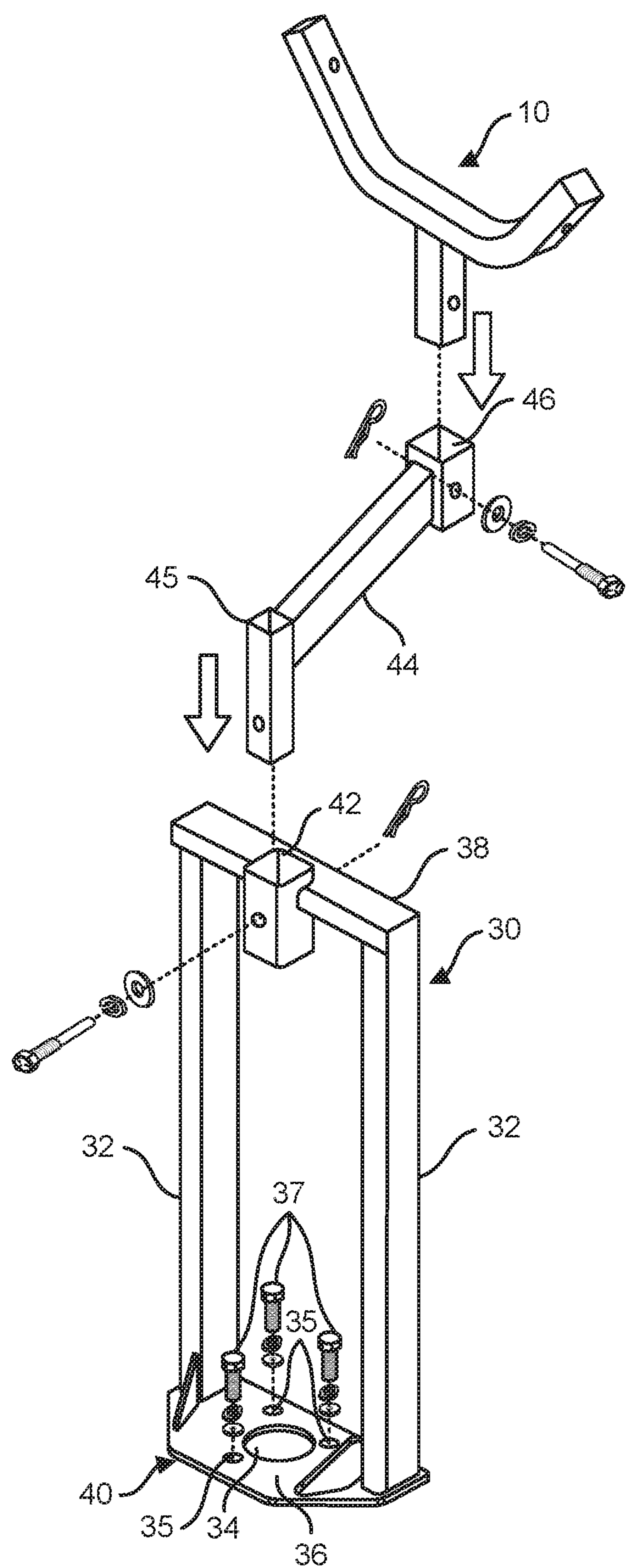
FIG. 6A is an exploded view of the perspective view of an embodiment of the present invention showing a base unit assembly, an accessory exchange adapter and Y-shaped arm member.
Figure 10:
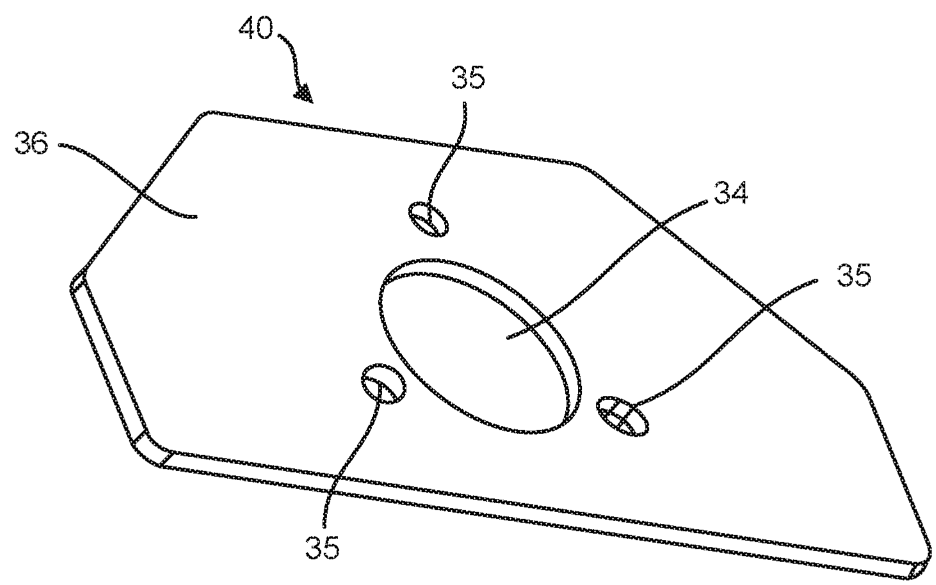
FIG. 10 is an elevated view of a bottom plate of the base unit assembly.

Referring to FIGS. 5 through 6A illustrate a particularly preferred embodiment of the present invention of a cargo carrier apparatus including base unit assembly 30 for use on a vehicle tongue comprising a bottom member, plate 40, a first and second riser members 32, having a middle portion 41 and a top end 45, of the first and second riser members 32 and the bottom end of the first and second riser members 32 are secured to a top side of the bottom plate 36 by securing fasteners 37 through fastener holes 35. Respective top ends of the first riser member and second riser member 32 are secured to a bottom side of the top member 38 having an accessory accessory mount 42, and a means to securedly affix an accessory to the accessory accessory mount 42 or accessory shank 45 to the top member 38. In this embodiment, first and second riser members 32 are configured to form a space large enough for a jack, and more specifically, a drop leg jack. Also, the riser members can have gussets that are attached to the top side of the bottom plate 40 and to the bottom ends 35, 37 of the riser members 32, 33 respectively. These gussets 39 provide additional stability for the riser members and prevent wobble. The jack is inserted through a hole 34 in bottom plate 40. As shown in FIG. 10, jack mounting plate 36 has mounting holes 35, usually three, that match with holes in the tongue and in the jack mounting plate 36. The base unit assembly 30 is secured to the tongue by the addition of mounting bolts 37 through the three holes 35 whereby the mounting bolts secure the jack and the base unit assembly 30 in their entirety and in addition to the tongue. This configuration solidly and securedly affix the cargo carrier apparatus to the vehicle tongue.

FIG. 5 specifically shows just the base unit assembly 30. This base unit assembly is the core of the cargo carrier apparatus and provides a solid, secure base to which the remainder of the cargo carrier is built. FIG. 6 shows a first embodiment of the base unit assembly 30 with the addition of the accessory exchange adapter 44. This accessory exchange adapter 44 is attached and secured to the base unit assembly 30 at accessory mount 42 that is typically located at a central location on the top member 38. This accessory mount 42 is typically a hollow portion that is usually cylindrical, circular or square. The accessory exchange adapter 44 can be secured to the accessory mount 42 using a pin as shown in FIG. 6A. In an alternative embodiment the accessory exchange adapter 44 is not used, but rather an alternative cargo accessory is secured directly to the base unit assembly. One such cargo accessory is described later as a four bicycle carrier but it could be any of a variety of cargo accessories.

Figure 7:
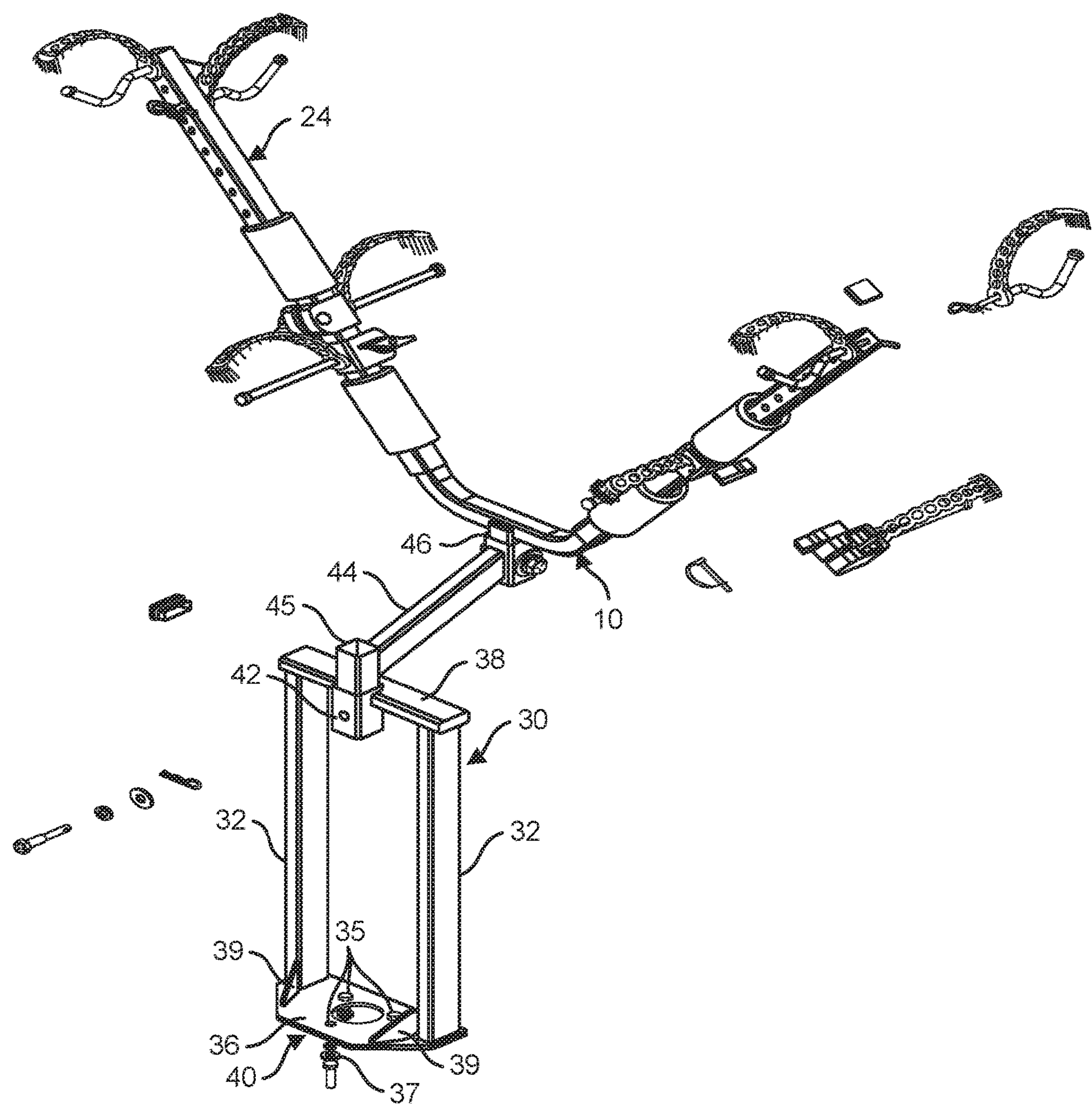
FIG. 7 is a perspective, partially exploded view of an embodiment of the present invention showing a base unit assembly, an accessory exchange adapter, the Y-shaped arm member and additional arm members that form a V-shaped bicycle rack.

In FIG. 6A the cargo carrier apparatus is shown in an exploded view including base unit assembly 30 shown in the lower portion, accessory exchange adapter 44 shown apart from the base unit assembly 30 and the Y receiver 10. In this embodiment, accessory exchange adapter 44 has a post 45 at a first end that is configured to matingly engage with a corresponding port of accessory mount 42. This post 45 can be secured to the hole via locking pins or any other securement device that will allow the post to be inserted and then easily removed. Extending from post 45 is an arm that extends from the first end to an opposite end and in the opposite end is another receiving portion 46. This receiving portion 46 is typically a hole that can receive any of a variety of lifestyle accessories. These lifestyle accessories can be bicycle racks, kayak racks, bags, ski racks, tool racks or any other imaginable cargo carrying apparatus. In the embodiment shown in FIG. 6A the receiving portion 46 receives the above described Y receiver 10. This member then receives another set of arm members, as is shown in FIG. 7. Specifically, this arm set then forms a V shaped configuration of arm members 24. The arms are configured with hooks and securement straps whereby a bicycle can be hung on the hooks by the bicycle wheels and then the wheels are secured to the hooks using the securement straps. It should be noted however that the accessory is not restricted or limited to arms for hanging a bicycle. Alternatively, arm members 24 are adaptable for use to hang or mount surf boards, snow boards, snow skis, water skis, weed wackers, yard tools, bags, kayaks and a plethora of other cargo carriers and equipment.

Figure 8:
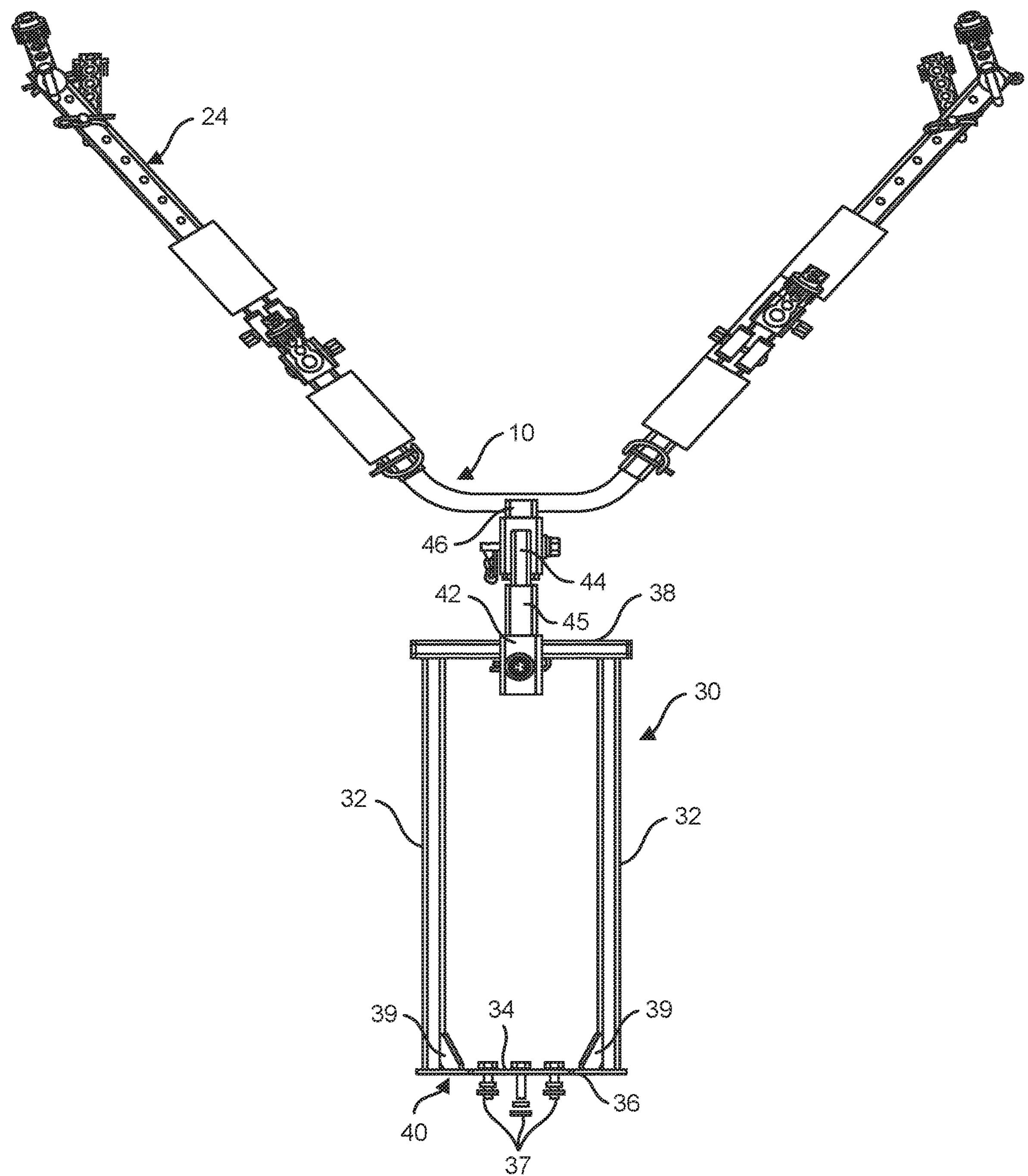
FIG. 8 is a frontal view of an embodiment of the present invention showing a base unit assembly, an accessory exchange adapter, the Y-shaped arm member and additional arm members that form a V-shaped bicycle rack.
Figure 9:
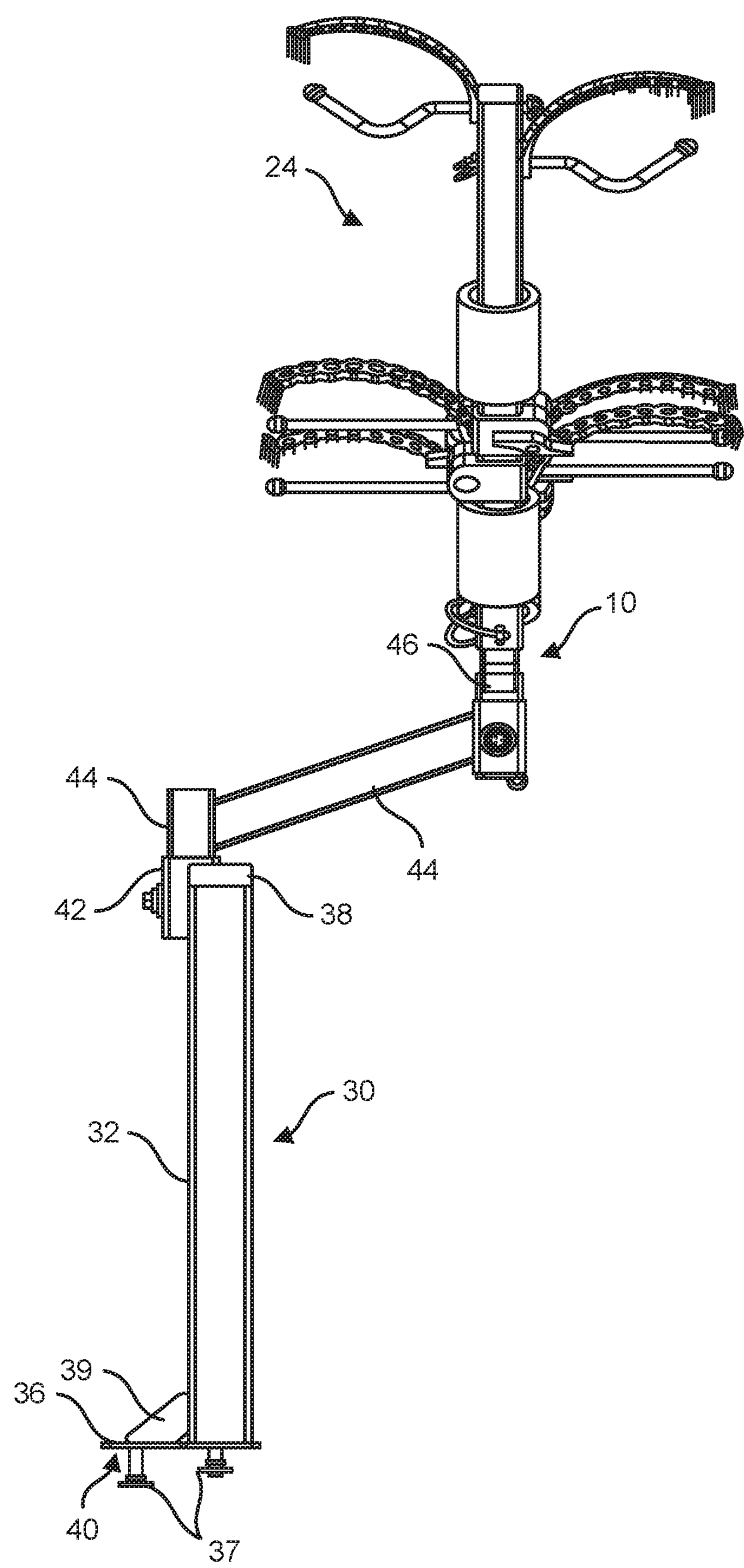
FIG. 9 is a side view of an embodiment of the present invention showing a base unit assembly, an accessory exchange adapter, the Y-shaped arm member and additional arm members that form a V-shaped bicycle rack.

FIG. 8 is a frontal view of the cargo carrying apparatus with the base unit assembly 30, the accessory exchange adapter 44, the Y receiver 10 and arm members 24 attached. FIG. 9 is a side view of this same embodiment.

Figure 11:
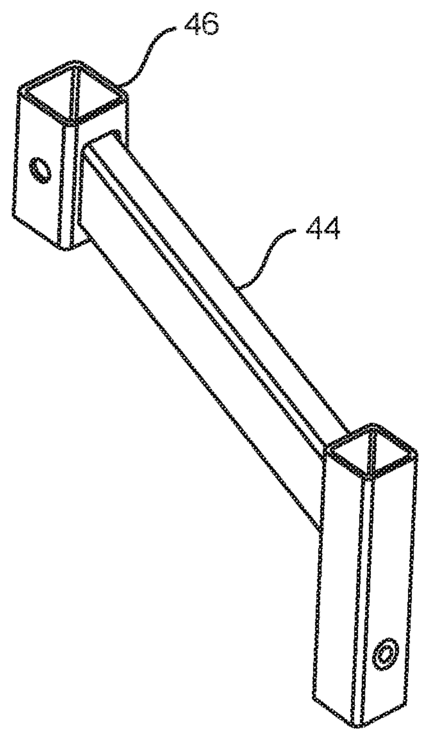
FIG. 11 is an elevated view of a first embodiment of the accessory exchange member.
Figure 11A:
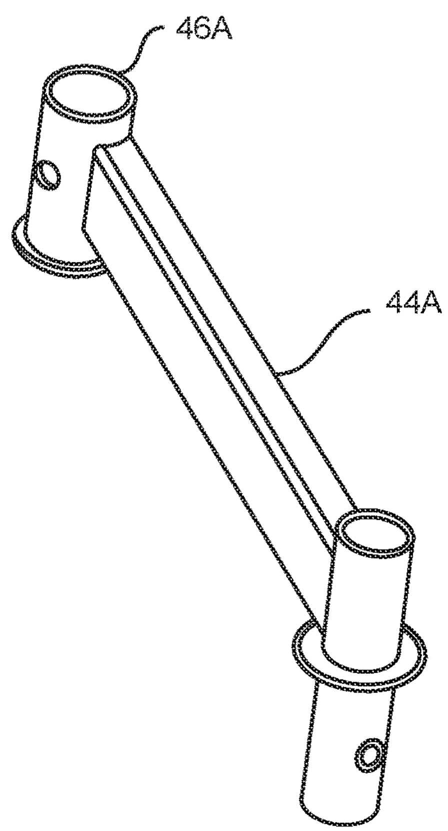
FIG. 11A is an elevated view of a second embodiment of the accessory exchange member.
Figure 11B:
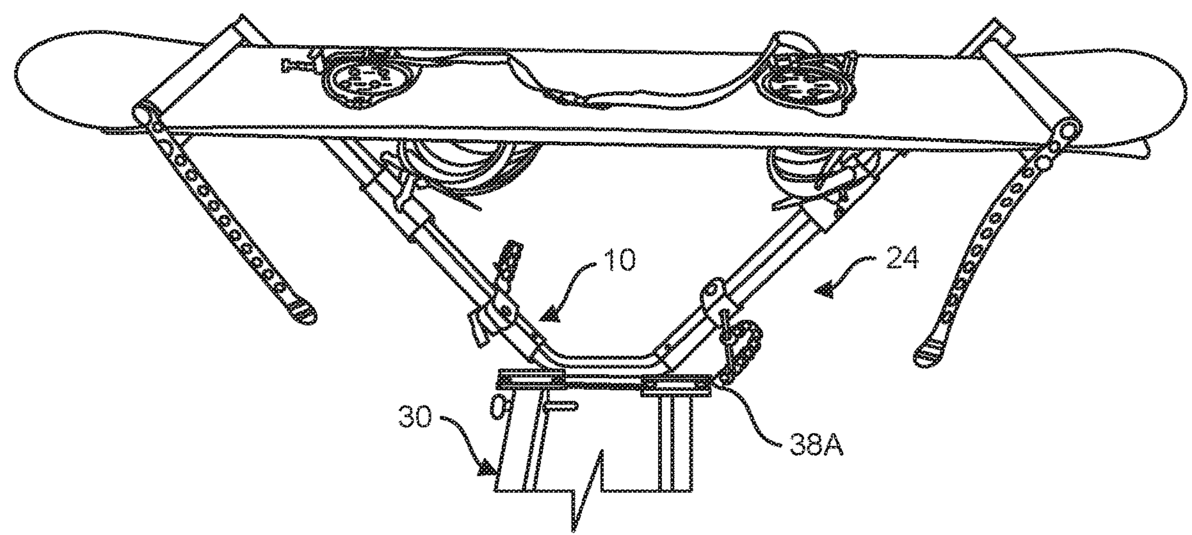
FIG. 11B is a view of the Y-shaped arm member with the additional arms added and being used as a snow board carrier.
Figure 11C:
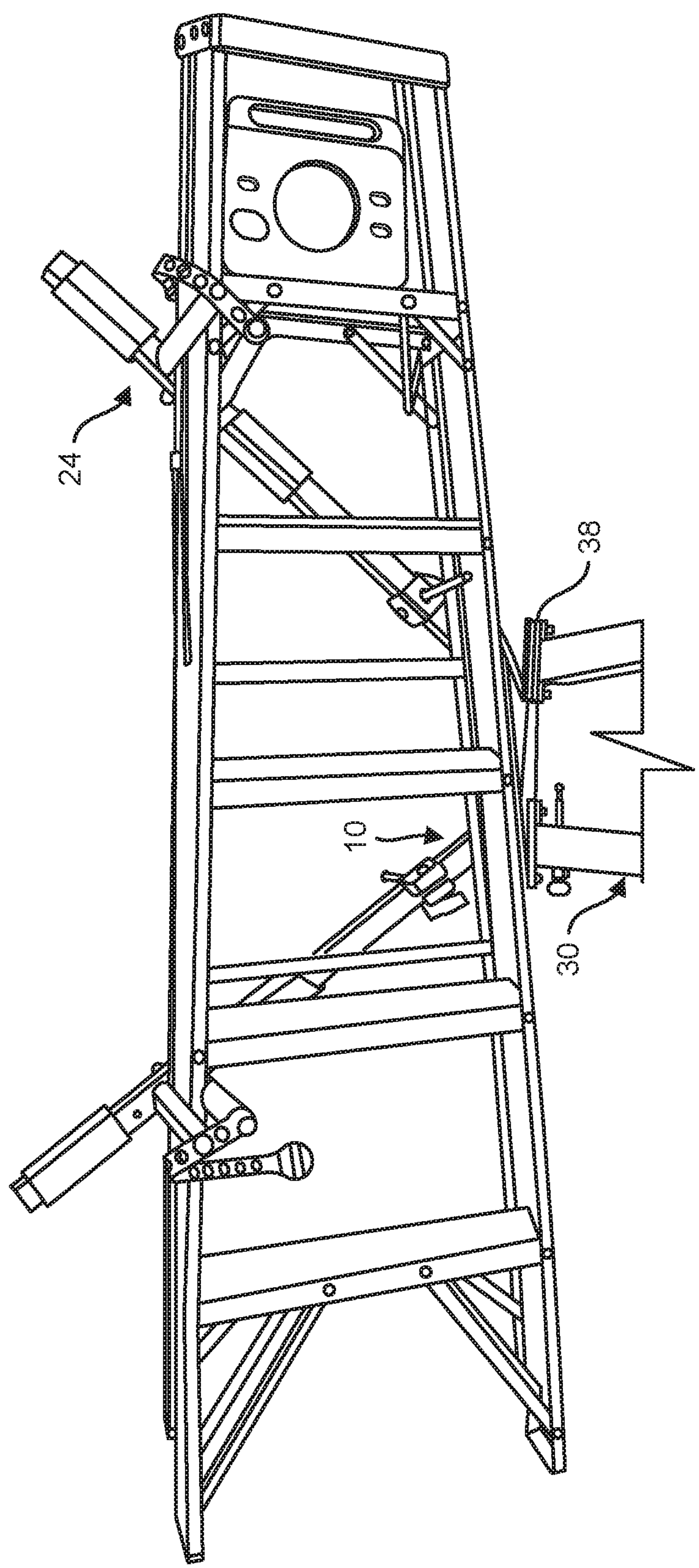
FIG. 11C is a view of the Y-shaped arm member with the additional arms added and being used as a ladder carrier.

FIGS. 11 and 11A demonstrate that there are alternative embodiments to the accessory exchange adapter 44. Specifically, FIG. 11 is an elevated view of the accessory exchange adapter 44. In a first embodiment shown in FIG. 11, the tubing is square. When this type of tubing is utilized the member is unmovable once inserted into accessory receiver mount 42 due to the square configuration. However, it may be desirable to have the accessory exchange adapter 44 moveable and adjustable about a variety of positions. To achieve this, it is possible to use round tubing instead of square tubing. As shown in FIG. 11A, the extension member 44A and the receiving portion 46A may be circular ports. By using the circular orientation, it is much easier to adjust the extension members 44, 44A position. Pins or other securement devices can be used to lock the accessory exchange adapter into place. FIG. 11B shows the V-shaped rack when used with a snow board or water ski board and FIG. 11C shows the same rack but used alternatively with a ladder. These images are meant to simply show that the cargo carrying apparatus has a multitude of uses and that it should not be restricted to bicycles only.

FIG. 12 is a frontal view of base unit assembly 30 when it is used with the drop leg jack 56. As can be seen, the riser arms 32 provide enough room for the jack to be inserted between the risers. When used with the jack the current invention can create storage space for items in a space and area that was previously inaccessible due to the jack being in the way. The present invention encompasses the jack and creates a mounting position on top of the jack in a space that was previously unusable. With the use of the base unit assembly 30 a user can now store bicycles, skis, boards, work gear, bags, and a virtually unlimited number of items. In this embodiment, a retractable A-frame trailer jack is fastened onto a lower frame member comprising a planar surface and bolted into the three holes 35 equally spaced adjacent a round slot perforation, hole 34, such that bolting down corresponding fastener holes 37 in a ledge about the jack housing centers the drop leg over the slot, hole 34. The jack drop leg 56 is thus released downward through the slot to prop and thereby support the trailer in a horizontally aligned, or level position, when the towing vehicle is detached. When not in use, the drop leg is retracted into a stored position within the jack housing, which is maintained in a stationary position in the rectangular pocket both in the aforedescribed use or stored position. Juxtaposition of base unit assembly 56 spaced apart from hitch ball 58 a distance facilitates attachment and detachment of a trailer on and off hitch ball 58 while also maintaining adequate clearance for loading, fastening, and unloading accessory mounts and cargo or equipment.

FIG. 13 illustrates a particularly preferred embodiment of the cargo carrying system of the present invention with the addition of a four bike rack attached thereto. This rack features arms 24 that pivot and extend outwardly or inwardly, are lockable in place, and are capable of carrying up to four bicycles by the wheels. In addition, the arms can be configured so that the outer portions of the arms are lockably connectable so that a table or platform can be installed on top of the now triangularly configured frame.

Potential configurations which may be employed to accommodate various vehicle and cargo types are too numerous and diverse to specify in detail herein. Variously configured and bulky items, such as bicycles, snowmobiles, dirt bikes, cargo boxes or even wheelchairs, may be attached by use of appropriate commercially available fasteners, such as, for example, bungee cords, pins and clamps, onto arms secured within the mounting members of the Y receiver above the rectangular pocket. As can be readily discerned, such fasteners could be readily adapted to attach equipment and cargo of various sizes. For example, the Y receiver may be adapted to transport skis and snowboards of successively shorter lengths by fastening them across the horizontal axis of the cargo carrier in order of descending lengths from the upper edge to the mounting bracket, the bottom of which could cradle a boot bag with boots secured onto the base plate. Similarly, water sports equipment and gear such as water skis, surfboards, and wake boards of successively descending lengths could be aligned and fastened along the arm members mounted on the Y receiver.

Alternative embodiments of the present invention may further include holes, notches, pockets or protrusions provided on the Y receiver 10 or arm members 24 for receiving and securing cargo.

Another aspect of the present invention is provided by alternative embodiments employing various types of fasteners adaptable to differing recreational equipment, tools and other cargo. Such fasteners and supports include, without limitation, cradles for wheels or other suitably shaped structures, hooks, bungees, clamps, clips, clasps and elastomer cords. Fasteners and supports are pinned, looped, clamped or otherwise secured on the cargo carrier to accommodate differing sizes and shapes of the recreational equipment, tools and cargo cases. Yet further and alternative embodiments of the present invention include employing such fasteners to secure diverse cargo types, including construction and yard equipment, tools and supplies. For example, cradles and bungee cords may be secured to holes of the tubular arms and fastened about additional frame members, carriers, equipment or other cargo. Adjustment of fasteners and supports along the angular orientation of arm members facilitate versatile adaptation accommodation to differing types, sizes and shapes of cargo.

Features and embodiments of the present invention are numerous and diverse, extending beyond the detailed description and claims herein. For example, the Y receiver and its mounting members, as well as, tubular arms of the present invention can be attached to other surfaces, items and containers not specified herein.

The cargo carrier system of another preferred embodiment further contemplates multiple carriers to be mounted onto one another to add additional capacity. Such latter embodiments may include extension shanks that connect carrier systems to one another.

It is to be expressly understood that other embodiments are considered to be within the scope of the present invention as set forth in the claims. For example, the carrier systems may be used with a single or dual shank carrier system such as those disclosed in U.S. patent application Ser. No. 09/683,820 incorporated herein by reference.

Moreover, component configurations and combinations of embodiments may diverge from specifications shown and described. Thus, the scope of the present invention includes various substitutions and assemblies among the versatile and portable carrier systems beyond the particular embodiments illustrated and specified herein.

It is therefore contemplated that other embodiments not illustrated in the drawings or described herein are considered to be within the scope of the present invention as set forth in the claims. Accordingly, configurations and combinations of the components of the carriers shown and described not specifically shown may diverge from those specified herein. The scope of the present invention thus includes any equivalent configuration or combination of the embodiments described and elements claimed.

What is claimed is:

1. A cargo carrier apparatus for use on a vehicle tongue comprising:

a bottom member;

a first riser member with a bottom end, a middle portion and a top end;

a second riser member with a bottom end, a middle portion and a top end;

where said bottom end of said first riser member and said bottom end of said second riser member are affixed to a top side of said bottom member;

a top member;

where said top end of said first riser member and said top end of said second riser member are affixed to a bottom side of said top member;

an accessory mount centrally located at said top member where said accessory mount has a vertically oriented tube receiver capable of receiving a variety of cargo carrying accessories; and a means to securedly affix an accessory to said accessory mount to said top member.

2. The cargo carrier apparatus of claim one further having a space between said middle portion of said first riser member and said middle portion of said second riser member that is large enough to accommodate a drop leg trailer jack.

3. The cargo carrier apparatus of claim two where said bottom member further includes a hole through a central portion of said bottom member that is large enough to insert said drop leg trailer jack therethrough.

4. The cargo carrier apparatus of claim three where said bottom member further includes a plurality of bottom member mounting holes positioned around said hole and where said bottom member mounting holes match a plurality of mounting holes on said vehicle tongue and a plurality of holes in said drop leg trailer jack such that said vehicle tongue, said drop leg trailer jack and said cargo carrier apparatus can all be securedly connected one to another.

5. The cargo carrier apparatus of claim four having a fastening mechanism to secure said bottom end of said first riser member and said bottom end of said second riser member to said bottom member that includes at least one corner gusset.

6. The cargo carrier apparatus of claim five further comprising an accessory exchange adapter where said accessory exchange adapter securedly connects any of said variety of accessories to said cargo carrier apparatus.

7. The cargo carrier apparatus of claim 6 further comprising a through hole that extends vertically through said accessory exchange adapter and said cargo carrier apparatus.

8. The cargo carrier apparatus of claim 6 where said cargo carrying accessory is a V-shaped apparatus.

9. A cargo carrier system for use on a vehicle tongue comprising:

a bottom member;

a first riser member with a bottom end, a middle portion and a top end;

a second riser member with a bottom end, a middle portion and a top end;

where said bottom end of said first riser member and said bottom end of said second riser member are secured to said bottom member;

a top member;

where said top end of said first riser member and said top end of said second riser member are secured to said top member;

an accessory mount and where said accessory mount is securedly affixed to at least said top member;

an accessory exchange adapter securedly connectable to said accessory mount; and a cargo carrying accessory securedly connectable to said accessory exchange adapter.

10. A cargo carrier system for use on a vehicle tongue comprising:

a bottom member secureably connectable to said vehicle tongue;

at least a first riser member with a bottom end, a middle portion and a top end;

where said bottom end of said at least first riser member is secured to a top side of said bottom member;

a top member having a top side and a bottom side;

where said top end of said at least first riser member is secured to said bottom side of said top member;

a receiving space located between said at least first riser member bottom end and said at least first riser member top end;

a centrally located accessory mount where said accessory mount has a vertically oriented tube receiver capable of receiving a variety of cargo carrying accessories;

a means to securedly affix said accessory mount to said top member; and a cargo carrying accessory securedly connectable to said accessory mount.

11. The cargo carrier system of claim 10 where said receiver space is large enough to accommodate a drop leg trailer jack and where said bottom member comprises a jack mounting plate having a central hole for said drop leg trailer jack where said central hole is large enough to insert said drop leg trailer jack therethrough.

12. The cargo carrier system of claim 11 where said bottom member, further comprising a plurality of mounting holes that matingly align with a plurality of drop leg trailer jack mounting holes for securing said cargo carrier system to said vehicle tongue and to said drop leg trailer jack.

13. The cargo carrier system of claim 12 further comprising an accessory exchange adapter securedly connectable to said accessory mount.

14. The cargo carrier system of claim 13 further having a cargo carrying accessory securedly connectable to said accessory exchange adapter.

15. The cargo carrier system of claim 14 where said cargo carrying accessory is V-shaped.

16. The cargo carrier system of claim 10 further including at least one corner gusset that is affixed to said bottom end of said at least first riser member and to said top side of said bottom member.

17. The cargo carrier system of claim 10 further comprising a through hole that extends vertically through said accessory exchange adapter and said cargo carrying accessory.

18. The cargo carrier system of claim 12 where said cargo carrying accessory is an apparatus with multiple arms where said arms can be configured to carry four bicycles or can be configured to form a platform.

* * * * *